United States Patent Office 2,739,137
Patented Mar. 20, 1956

2,739,137

METHOD FOR MAKING POLYMERIC HYDROSOLS

William F. Fowler, Jr., Rochester, N. Y., assignor to Eastman Kodak Company, Rochester, N. Y., a corporation of New Jersey No Drawing. Application February 20, 1952, Serial No. 272,709

5 Claims. (Cl. 260—29.6)

My invention relates to the preparation of hydrosols by polymerizing together unsaturated aliphatic amides, acrylic acid esters and a styrene compound in the form of an emulsion under conditions whereby a hydrosol is obtained which is useful for combining with hydrophilic colloids in the various uses to which those colloids are put.

Many of the hydrophilic colloids, and particularly gelatin, when coated out in the form of a film or coating, may exhibit brittleness. Also, at the present time, gelatin of photographic purity is in considerable demand and any material which, when mixed with gelatin, improves its properties and helps in extending the supply thereof is of considerable value.

Polymers have been previously prepared for many purposes, such as for molding compositions, for use in the protective coating field or to prepare products having good workability. However, there have been few, if any, polymeric compositions developed for the purpose of incorporating in hydrophilic colloids to improve their properties.

One object of my invention is to provide a polymeric composition which is useful for incorporating in gelatin compositions for the purpose of improving the properties of the gelatin and extending its usefulness. Another object of my invention is to provide a method for preparing polymers in the form of an aqueous dispersion of good physical characteristics. A further object of my invention is to provide a method for copolymerizing an unsaturated aliphatic amide, an acrylic acid ester and an unsaturated aromatic compound so as to obtain a latex of that polymer which readily lends itself to mixing with water solutions of other colloidal materials. A still further object of my invention is to provide a method for preparing polymers by the use of an emulsion polymerization method. Other objects of my invention will appear herein.

I have found that an unsaturated aliphatic amide and an acrylate, preferably with some unsaturated aromatic monomer therein, when put in the form of an aqueous solution and/or dispersion, can be polymerized by a simple method whereby there results an emulsion of the polymer in a form for immediate use, such as for mixing with a solution of gelatin or any other water-soluble colloid with which it is to be used. My process involves the use of:

1. An unsaturated aliphatic amide which will be referred to herein as the hydrophillic monomer. This compound will be one having the following structural formula

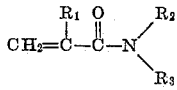

wherein $R_1$ is a hydrogen, halogen, alkyl or cyano substituent and $R_2$ and $R_3$ may be either hydrogen or alkyl.

2. A monomer having the following structural formula

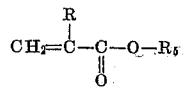

wherein $R_4$ is a hydrogen, halogen or an alkyl substituent, and $r_5$ is an alkyl, cyano alkyl or halogenated alkyl group. The compounds of this type will be referred to herein as the plasticizing or softening monomer.

3. A monomer having the following structural formula

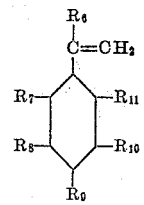

wherein $R_6$ is hydrogen, halogen or an alkyl, and $R_7$, $R_8$, $R_9$, $R_{10}$ and $R_{11}$ may each be any of the following: hydrogen, halogen, alkyl, nitro, cyano or dialkyl amino. In compounding the monomers in accordance with my invention, the monomers designated 1 and 2 should each be present in a proportion at least 2% of the total monomer composition. However, the sum of these two monomers should constitute at least 30% of the composition. The class of monomers designated 3 should not constitute any more than 70% of the total monomer mixture employed. Although in some cases it may be desirable to entirely dispense with the unsaturated aromatic constituent, it is preferred that at least 5% thereof, based on the total monomer present, be used so as to assure the obtaining of a polymer which is free of tackiness under all conditions of operation. As an example of compounds which are useful as constituent 1, any of the following unsaturated aliphatic amides are useful for this purpose:

1. Acrylamide
2. α-Ethyl acrylamide
3. α-n-Propyl acrylamide
4. α-Isopropyl acrylamide
5. α-n-Butyl acrylamide
6. α-n-Octyl acrylamide
7. N-methyl acrylamide
8. N-ethyl acrylamide
9. N-isopropyl acrylamide
10. N-n-propyl acrylamide
11. N-n-butyl acrylamide
12. N-isobutyl acrylamide
13. N-n-hexyl acrylamide
14. N,N-dimethyl acrylamide
15. N,N-diethyl acrylamide
16. N,N-di-(n-propyl)acrylamide
17. N,N-di(isopropyl)acrylamide
18. N,N-di(n-butyl)acrylamide
19. N,N-di(n-butyl)methacrylamide
20. Methacrylamide Acrylic acid esters which are useful as constituent 2 in the composition referred to above are the following:

1. Methyl acrylate
2. Ethyl acrylate
3. n-Propyl acrylate
4. Isopropyl acrylate
5. Isobutyl acrylate
6. n-Amyl acrylate
7. Isoamyl acrylate
8. n-Hexyl acrylate
9. 2-ethyl hexyl acrylate
10. n-Octyl acrylate
11. n-Decyl acrylate
12. Methyl methacrylate 13. Ethyl methacrylate
14. n-Propyl methacrylate
15. Isopropyl methacrylate
16. n-Butyl methacrylate
17. Isobutyl methacrylate
18. n-Amyl methacrylate
19. 2-ethyl hexyl methacrylate
20. n-Octyl methacrylate
21. n-Decyl methacrylate
22. β-Cyanoethyl acrylate
23. β-Cyanoethyl methacrylate
24. β-Chloroethyl acrylate
25. β-Chloroethyl methacrylate
26. n-Butyl acrylate Of the monomers of the unsaturated aromatic type which may be employed as constituent 3 where that is used, any compounds selected from the following list may be employed:

1. o-Methyl styrene
2. m-Methyl styrene
3. p-Methyl styrene
4. 2,4-dimethyl styrene
5. 2,5-dimethyl styrene
6. 3,4-dimethyl styrene
7. 3,5-dimethyl styrene
8. 2,4,5-trimethyl styrene
9. 2,4,6-trimethyl styrene
10. 2,4,5-triethyl styrene
11. o-Ethyl styrene
12. m-Ethyl styrene
13. p-Ethyl styrene
14. 3,5-diethyl styrene
15. p-n-Butyl styrene
16. m-Sec-butyl styrene
17. m-Tert-butyl styrene
18. p-Hexyl styrene
19. p-n-Heptyl styrene
20. p-2-ethyl hexyl styrene
21. o-Fluoro styrene
22. m-Fluoro styrene
23. p-Fluoro styrene
24. o-Chloro styrene
25. m-Chloro styrene
26. p-Chloro styrene
27. 2,3-dichloro styrene
28. 2,4-dichloro styrene
29. 2,5-dichloro styrene
30. 2,6-dichloro styrene
31. 3,4-dichloro styrene
32. 3,5-dichloro styrene
33. 2,3,4,5,6-pentachloro styrene
34. m-Trifluoromethyl styrene
35. o-Cyano styrene
36. m-Cyano styrene
37. m-Nitro styrene
38. p-Nitro styrene
39. p-Dimethylamino styrene
40. Styrene The preparation of the polymer is carried out by combining the monomers in an aqueous system. The amide constituent is soluble in water and the softener or plasticizing monomer, and the unsaturated aromatic compound can be incorporated by dispersing those in water, such as by the use of a wetting agent. For this purpose an anionic surface active agent is preferred, such as sodium lauryl sulfate. Other dispersing agents, however, such as (1) cetyl dimethyl ethyl ammonium bromide, (2) sodium stearate, (3) sulfonates of an octyl phenoxy polyethylene glycol, (4) sodium salts of alkyl-aryl sulfonates, (5) sodium salts of alkyl naphthyl sulfonates and (6) sodium salts of sulfated monoglycerides may be employed in this connection. The monomers ordinarily are present in a dilute solution, such as within the range of 5-60%, the monomer concentration used being not critical but governed by the convenience of the individual operator. Also incorporated in the dispersion is a catalyst adapted to promote the polymerization of the monomers. Either of two methods of polymerization may be used: (1) heating on a steam bath or (2) carrying out at substantially room temperature (15-30° C.). Where a steam bath polymerization is employed, a water soluble per-compound may be employed as the catalyst, as, for example, ammonium persulfate, potassium persulfate, hydrogen peroxide, sodium perborate, sodium peracetic acid or the like. If, on the other hand, the polymerization of the monomer dispersion is carried out at room temperature, a redox system catalyst is employed, such as a mixture of sodium acid sulfite and ammonium persulfate or some other per-compound, a mixture of ascorbic acid and a per-compound or a mixture of a ferrous ion compound and a per-compound, or any other redox system catalyst which has been described as being suitable for promoting the polymerization of monomers. If the amide component of the dispersion is of the N-substituted type, it is advisable to carry out the polymerization by the second method, namely, using room temperature and a redox system catalyst. If, on the other hand, the amide employed is not N-substituted, either carrying out the polymerization at room temperature referred to as method 2 or at an elevated temperature, such as 80-120° C., as referred to as method 1, may be conveniently employed in preparing the hydrosol of the polymer in accordance with my invention. It is desirable in carrying out the polymerization that the mass be vigorously agitated, and that the liquid monomer be added over a comparatively short period. For instance, with vigorous agitation and fairly rapid addition of the monomer, products are obtained having a hydrosol particle size on the order of 0.1 micron or less in diameter. On the other hand, if the agitation is not as vigorous or the monomer is added over a longer period of time, a greater size results. The preparation of the polymer should be carried out using sufficient speed of agitation and of addition of monomer, that the size of the particles of the hydrosol prepared is not more than 1 micron. The time necessary for carrying out the polymerization in accordance with my invention is short, the completion thereof being determined by the absence of the odor of any monomer in the reaction mass. The resulting dispersion obtained may be used directly in mixing with aqueous gelatin compositions or in any other connection in which use thereof is indicated. I have found that when the amide employed is acrylamide rather than a substituted acrylamide, it is desirable to use the resulting product shortly after its preparation. The following examples illustrate my invention:

*Example 1*

19.9 parts of freshly recrystallized methacrylamide, 1.26 parts of sodium lauryl sulfate and 0.63 part of potassium persulfate were dissolved in 500 parts of hot water, and the solution was placed in a container provided with a reflux condenser, a mechanical stirrer and a dropping funnel. This solution was stirred and heated on the steam bath, while a mixture containing 41.5 parts of n-butyl acrylate and 64.9 parts of washed styrene was added over a period of 40 minutes. After the monomers were added, the mass was heated for a few minutes longer, whereupon no odor of monomer was detected in the mass and an opaque white hydrosol was obtained. The total time for the complete procedure did not exceed 45 minutes. Analysis indicated that substantially complete polymerization had occurred.

A small sample of the suspended polymer was coagulated with aluminum ion and washed. The resulting polymer was found to be insoluble in both water and acetone. The hydrosol as prepared above, when incorporated in paper pulp together with the sodium salt of pimaric acid-maleic anhydride adduct and aluminum chloride, from which paper was made, was found to result in a product having high wet strength, a good degree of sizing, and superior dry bursting strength.

Example 2

Several preparations of hydrosols using styrene, butyl acrylate and methacrylic amide, following the same procedure as in Example 1, were carried out. Those in which the methacrylamide was not more than 20% were useful for incorporating in paper pulp as a sizing material therefor. The proportions employed in each of the preparations were as follows:

|   | Methacrylamide | | n-Butyl Acrylate | | Styrene | |
|---|---|---|---|---|---|---|
|   | Parts | Weight Percent | Parts | Weight Percent | Parts | Weight Percent |
| A | 33.8 | 26.8 | 50.8 | 40.3 | 41.3 | 32.9 |
| B | 18.7 | 14.8 | 84.5 | 67.1 | 22.8 | 18.1 |
| C | 9.5 | 7.5 | 64.2 | 51.0 | 52.3 | 41.5 |
| D | 20.4 | 16.2 | 30.8 | 24.4 | 74.8 | 59.4 |
| E | 49.2 | 39.0 | 16.5 | 13.1 | 60.3 | 47.9 |
| F | 66.0 | 52.4 | 33.2 | 26.4 | 26.8 | 21.2 |
| G | 45.3 | 36.0 | 68.4 | 54.3 | 12.3 | 10.6 |
| H | 20 | 15.7 | 42 | 33.0 | 65 | 51.3 |
| I | 15 | 11.8 | 42 | 33.0 | 70 | 55.2 |
| J | 10 | 7.8 | 42 | 33.0 | 75 | 59.2 |
| K | 5 | 3.9 | 42 | 33.0 | 80 | 63.1 |

Example 3

Monomer compositions as listed below were polymerized to form hydrosols by a procedure like that of Example 1, but using the following mixture as the vehicle in which the reaction is performed: 1000 parts hot water, 1.26 parts of potassium persulfate, 5.04 parts of sodium lauryl sulfate. This procedure resulted in final products which were white and opaque, of good stability and having a pH equal to, or slightly higher than, 8.5. The resulting hydrosol was found to have a 20% solids content, and was free of the odor of any of the monomers employed. Many of these hydrosols were found to be useful as carriers for barium sulfate for the purpose of applying a coating thereof on paper.

|   | Methacrylamide | | n-Butyl Acrylate | | Styrene | |
|---|---|---|---|---|---|---|
|   | Parts | Weight Percent | Parts | Weight Percent | Parts | Weight Percent |
| A | 40 | 15.7 | 84 | 33.1 | 130 | 51.2 |
| B | 40 | 15.7 | 150 | 59.1 | 64 | 25.2 |
| C | 40 | 15.7 | 118 | 46.5 | 96 | 37.8 |
| D | 30 | 11.8 | 123 | 48.5 | 101 | 39.7 |
| E | 20 | 7.8 | 129 | 50.7 | 105 | 41.5 |
| F | 10 | 3.9 | 135 | 53.2 | 109 | 42.9 |
| G | 38 | 15.0 | 178 | 70.0 | 38 | 15.0 |
| H | 38 | 15.0 | 51 | 20.1 | 165 | 64.9 |
| I | 20 | 7.8 | 92 | 36.2 | 142 | 56.0 |
| J | 60 | 23.6 | 77 | 30.3 | 117 | 46.1 |

Example 4

A mixture of 900 parts of hot water, 2.5 parts of potassium persulfate, 10 parts of sodium lauryl sulfate (Duponol-ME) and 39 parts of methacrylamide were mixed together in a vessel equipped with a reflux condenser, a mechanical stirrer and a dropping funnel. This mixture was heated by applying steam to the vessel, and was stirred while ½ of a mixture of 126 parts of styrene and 295 parts of n-butyl acrylate was added over a period of about 20 minutes. Thereupon 40 parts of methacrylamide dissolved in 100 parts of water were slowly added, while the other half of the liquid monomer mixture was being added to the mass, this addition taking place over a period of approximately 30 minutes. At the end of all the additions, or about 1.25 hours later, the heating and stirring were discontinued. A white opaque hydrosol of low viscosity and containing 30% solids was obtained. This hydrosol was useful as a carrier for barium sulfate in applying baryta coatings to paper.

Example 5

Emulsion polymerizations were carried out by the procedure described in Example 1, but the respective preparation in every case used the proportions found in the following table:

|   | Acrylamide | | n-Butyl Acrylate | | Styrene | |
|---|---|---|---|---|---|---|
|   | Parts | Weight Percent | Parts | Weight Percent | Parts | Weight Percent |
| A | 10 | 7.9 | 58 | 45.6 | 59 | 46.5 |
| B | 20 | 15.8 | 66 | 52.0 | 41 | 32.2 |
| C | 33 | 26.0 | 42 | 37.0 | 42 | 37.0 |
| D | 20 | 15.8 | 31 | 24.4 | 76 | 59.8 |
| E | 8 | 6.3 | 60 | 46.8 | 60 | 46.8 |
| F | 20 | 15.8 | 89 | 70.0 | 18 | 14.2 |
| G | 13 | 10.2 | 57 | 44.9 | 57 | 44.9 |
| H | 12.5 | 9.8 | 80 | 62.8 | 35 | 27.4 |
| I | 10 | 7.9 | 82 | 64.6 | 35 | 27.5 |

In each case there resulted an opaque white hydrosol in which the polymer formed was in suspension in the aqueous liquid. It is desirable, in the case of the hydrosols prepared in this example, that these be used within a few hours of their preparation, as these hydrosols will, in a few days, form insoluble gels upon standing.

Example 6

A hydrosol was prepared by vigorously agitating, at room temperature while nitrogen was slowly bubbled therethrough, a mixture of the following materials in a vessel of the type referred to hereinbefore: 20 parts of N-isopropyl acrylamide, 75 parts of n-butyl acrylate, 32 parts of styrene, 500 parts of cold water, .127 part of potassium persulfate, .127 part of sodium acid sulfite, 2.5 parts of sodium lauryl sulfate. At the end of an hour the reaction vessel had become warm to the feel. At the end of 2 hours the reaction appeared to be complete, as evidenced by the absence of any odor of monomer, even though some of this material was heated upon a steam bath. The hydrosol obtained could be coated out to form clear films, or it could be mixed with various hydrophilic colloids, such as an aqueous solution of gelatin, and coated out to form a film.

Example 7

The following mixture was stirred for 2 hours in a manner similar to that employed in the preceding example, while cooling with a running water bath of 26° C., using an atmosphere of nitrogen: 40 parts of N-isopropyl acrylamide, 61 parts of n-butyl acrylate, 26 parts of styrene, 500 parts of water at 26° C., 2.5 parts of sodium lauryl sulfate, .127 part of potassium persulfate, .127 part of sodium acid sulfite. A hydrosol resulted which could be coated upon a glass plate to produce a clear film on drying, which film had acetone solubility.

Example 8

This example is to illustrate how the average particle size of the hydrosol may be varied by variation in the rate of addition of the monomer and the rate of stirring:

*a*. The hydrosol resulting from the preparation B of Example 3 was tested for average particle size by electron micrography, and was found to be approximately 0.1 of a micron in diameter.

*b*. This preparation B of Example 3 was repeated, except that a sweep type stirrer, rotating at 89 R. P. M., was employed instead of the extremely rapidly rotating stirrer used there. An average particle size of about 0.5 micron diameter resulted.

*c*. When preparation B of Example 3 was repeated, but using 2.5 hours for the addition of the liquid monomer mixture to the water in carrying out the reaction, a hydrosol was obtained having an average particle size of 0.5 micron diameter. Thus it may be seen that the particle size of the hydrosol obtained may be varied by either varying the speed of stirring of the reacting mass, varying the time of addition of the monomer to the water in which the reaction is carried out, or both.

*Example 9*

The following mixture was formed, stirred and heated by the method described in Example 1: 1000 parts hot water, 1.27 parts potassium persulfate, 5 parts sodium lauryl sulfate, 128 parts of n-butyl acrylate, 86 parts of 2,5-dichlorostyrene, 40 parts of methacrylamide. A hydrosol of good quality was obtained after 45 minutes of heating, which time also included that in which the liquid monomers were added to the water containing the catalyst and the dispersing agent.

*Example 10*

The procedure employed in B of Example 3 was repeated, except that ethyl acrylate was employed instead of n-butyl acrylate. A hydrosol of good properties was obtained, which was capable of being coated out to form a clear, tough film having no tackiness.

*Example 11*

The procedure described in Example 1 was used for preparing a hydrosol from the following mixture: 1000 parts hot water, 1 part potassium persulfate, 5 parts sodium lauryl sulfate, 40 parts of methacryl amide, 77.5 parts of p-chlorostyrene, 136.5 parts n-butyl acrylate. A hydrosol of good quality was obtained, and coatings made therefrom had good clarity and flexibility. The polymer found was recovered from some of this hydrosol by precipitating with good agitation into acetone. After thoroughly drying, this polymer and also the dried film were analyzed, indicating that the 2 products were the same, and that the polymerization as carried out had essentially gone to completion in the reaction described.

*Example 12*

The procedure of Example 1 was followed, using the following mixture of a catalyst, dispersing agent, and monomers in 1000 parts of hot water: 1 part of potassium persulfate, 5 parts of sodium lauryl sulfate, 40 parts of methacrylamide, 107 parts of n-butyl methacrylate, 107 parts of n-butyl acrylate. A hydrosol of good quality was obtained thereby.

*Example 13*

A hydrosol was prepared by the procedure described in Example 1, using a mixture of the following in carrying out the preparation thereof: 500 parts of hot water, .63 part of potassium persulfate, 2.52 parts of sodium lauryl sulfate, 20 parts of methacrylamide, 75 parts of 2-ethyl hexyl acrylate, 32 parts of styrene. A good hydrosol was obtained which, upon coating out and drying, produced a clear, flexible skin.

*Example 14*

The following mixture was employed to prepare a hydrosol in accordance with the procedure described herein: 500 parts of hot water, .63 part of potassium persulfate, 2.52 parts of sodium lauryl sulfate, 20 parts of acrylamide, 58 parts of n-butyl methacrylate and 59 parts of styrene. A hydrosol was obtained which could be coated out into the form of a flexible film.

*Example 15*

A polymeric hydrosol was prepared as described above, using the following composition, with the exception that the reaction temperature throughout the polymerization was maintained between 68° and 71° C.: 1,000 parts hot water, 1.27 parts of potassium persulfate, 5 parts of sodium lauryl sulfate, 40 parts of methacrylamide, 64 parts of styrene, 150 parts of isobutyl acrylate. There was obtained a translucent hydrosol which, when coated out, gave a clear, tough film. In the various examples given herein wherein hot water is specified, it is to be understood as meaning water having a temperature of 80° to 100° C.

I claim:

1. A method of preparing a hydrosol readily compatible with gelatin solution which comprises polymerizing in an aqueous system methacrylamide, n-butyl acrylate and styrene, the methacrylamide and n-butyl acrylate constituting at least 2%, and their sum at least 30% of the total monomer present.

2. A method of preparing a hydrosol readily compatible with gelatin solution which comprises polymerizing in an aqueous system a mixture of approximately 40 parts of methacrylamide, approximately 150 parts of n-butyl acrylate, and approximately 64 parts of styrene.

3. A method of preparing a hydrosol readily compatible with gelatin solution which comprises dissolving 40 parts of methacrylamide, 5.04 parts of sodium lauryl sulfate and 1.26 parts of potassium persulfate in 1000 parts of hot water while heating this solution, introducing thereto 150 parts of n-butyl acrylate and 64 parts of styrene, and continuing the heating of the mass until a white opaque hydrosol is obtained.

4. The hydrosol which results from the emulsion polymerization of an aqueous system of a mixture of methacrylamide n-butyl acrylate and styrene, the methacrylamide and n-butyl acrylate constituting at least 2% of the mixture and their sum at least 30% of the total monomer present in the mixture.

5. A hydrosol which results from the emulsion polymerization of an aqueous system of a mixture of methacrylamide, n-butyl acrylate and styrene in the proportions of approximately 40 parts of methacrylamide, approximately 150 parts of n-butyl acrylate and approximately 64 parts of styrene.

References Cited in the file of this patent

UNITED STATES PATENTS

| | | |
|---|---|---|
| 2,123,599 | Fikentscher et al. | July 12, 1938 |
| 2,140,048 | Fikentscher et al. | Dec. 13, 1938 |
| 2,550,652 | Dreschel | Apr. 24, 1951 |
| 2,592,218 | Weisgerber | Apr. 8, 1952 |

OTHER REFERENCES

Serial No. 397,138, Fikentscher et al. (A. P. C.), published May 19, 1943.